(12) United States Patent
Oh et al.

(10) Patent No.: US 12,465,885 B2
(45) Date of Patent: Nov. 11, 2025

(54) DEHUMIDIFICATION DEVICE

(71) Applicant: SAMSUNG ELECTRONICS CO., LTD., Suwon-si (KR)

(72) Inventors: Jinyounggeul Oh, Suwon-si (KR); Hyunnam Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 334 days.

(21) Appl. No.: 18/122,261

(22) Filed: Mar. 16, 2023

(65) Prior Publication Data

US 2023/0233991 A1    Jul. 27, 2023

Related U.S. Application Data

(63) Continuation of application No. PCT/KR2021/012947, filed on Sep. 23, 2021.

(30) Foreign Application Priority Data

Nov. 10, 2020  (KR) .......................... 10-2020-0149425

(51) Int. Cl.
  *B01D 53/26*      (2006.01)
  *A47L 23/20*      (2006.01)

(52) U.S. Cl.
  CPC ............ *B01D 53/265* (2013.01); *A47L 23/20* (2013.01); *B01D 2257/80* (2013.01)

(58) Field of Classification Search
  CPC .... B01D 53/265; B01D 2257/80; A47L 23/20
  See application file for complete search history.

(56) References Cited

U.S. PATENT DOCUMENTS 6,415,618 B1    7/2002    Sul et al.
6,513,377 B1    2/2003    Sassi et al.
(Continued)

FOREIGN PATENT DOCUMENTS

CN    106592694 A    4/2017
EP    1 659 207 A1    5/2006
(Continued)

OTHER PUBLICATIONS

Yoo et al., Laundry Treating Machine and Control Method of the Same, Jul. 10, 2009, KR20090105119A, Whole Document (Year: 2009).*

(Continued)

*Primary Examiner* — Larry L Furdge
(74) *Attorney, Agent, or Firm* — STAAS & HALSEY LLP

(57) ABSTRACT

A dehumidification device including a main body including a treatment chamber; a heat exchanger to cool air discharged from the treatment chamber; a water collection container that is installable inside the main body so that water condensed by the heat exchanger is collected therein; and a sensing unit including first, second, and third terminals, the sensing unit being configured so that in response to the water collection container is installed inside the main body, the second terminal becomes electrically connected to the first terminal to thereby detect the installation of the water collection container inside the main body, and in response to a predetermined amount of water is collected in the water collection chamber while the water collection container is installed inside the main body, the third terminal becomes electrically connected to the first terminal through the water to thereby detect the predetermined amount of water being collected in the water collection chamber.

15 Claims, 10 Drawing Sheets

(56) References Cited

U.S. PATENT DOCUMENTS

| | | | |
|---|---|---|---|
| 6,810,732 | B2 | 11/2004 | Shon |
| 7,913,522 | B2 | 3/2011 | Park |
| 8,087,266 | B2 | 1/2012 | Cho |
| 8,793,893 | B2 | 8/2014 | Bae et al. |
| 8,899,558 | B2 | 12/2014 | Choi |
| 9,250,016 | B2 | 2/2016 | Kim et al. |
| 10,288,657 | B2 | 5/2019 | Ivanov et al. |
| 10,578,481 | B2 | 3/2020 | Myeong et al. |
| 10,928,081 | B2 | 2/2021 | Cho et al. |
| 2005/0034250 | A1 | 2/2005 | Oh et al. |
| 2008/0034808 | A1 | 2/2008 | Cho |
| 2009/0107188 | A1 | 4/2009 | Park |
| 2013/0083883 | A1 | 4/2013 | Morris |
| 2014/0013616 | A1 | 1/2014 | Lee et al. |
| 2019/0041071 | A1* | 2/2019 | Cho .................. F24F 3/14 |

FOREIGN PATENT DOCUMENTS

| | | |
|---|---|---|
| EP | 2 927 617 B1 | 12/2019 |
| JP | 6-337222 A | 12/1994 |
| JP | 7-113464 A | 5/1995 |
| JP | 2002-107203 A | 4/2002 |
| JP | 4188856 B2 | 9/2008 |
| JP | 2014-98561 A | 5/2014 |
| KR | 2002-0097470 A | 12/2002 |
| KR | 10-0420505 B1 | 3/2004 |
| KR | 10-0500887 B1 | 7/2005 |
| KR | 10-0535680 B1 | 12/2005 |
| KR | 10-0561175 B1 | 3/2006 |
| KR | 10-0700534 B1 | 3/2007 |
| KR | 10-0747534 B1 | 8/2007 |
| KR | 10-0753506 B1 | 8/2007 |
| KR | 10-0803126 B1 | 2/2008 |
| KR | 10-2008-0083995 A | 9/2008 |
| KR | 10-2009-0083325 A | 8/2009 |
| KR | 20090105119 A * | 10/2009 |
| KR | 10-2010-0032795 A | 3/2010 |
| KR | 10-2010-0086890 | 8/2010 |
| KR | 10-2011-0125983 A | 11/2011 |
| KR | 10-2012-0079380 A | 7/2012 |
| KR | 10-1200085 B1 | 11/2012 |
| KR | 10-1208532 B1 | 12/2012 |
| KR | 10-1253126 B1 | 4/2013 |
| KR | 10-2013-0059164 A | 6/2013 |
| KR | 10-2013-0082365 A | 7/2013 |
| KR | 10-1581115 B1 | 1/2016 |
| KR | 10-2017-0032626 A | 3/2017 |
| KR | 10-2018-0090419 A | 8/2018 |
| KR | 10-1952327 B1 | 2/2019 |
| KR | 10-2019-0041353 A | 4/2019 |
| KR | 10-1968401 B1 | 4/2019 |
| KR | 10-2019-0056353 A | 5/2019 |
| KR | 10-2020-0022665 A | 3/2020 |
| WO | WO 2013/095735 A1 | 6/2013 |
| WO | WO 2016/019988 A1 | 2/2016 |

OTHER PUBLICATIONS

International Search Report, PCT/ISA/210, dated Jan. 3, 2022, in International Application No. PCT/KR2021/012947.
Extended European Search Report dated Feb. 29, 2024 for European Application No. 21892118.7.

* cited by examiner

DEHUMIDIFICATION DEVICE

CROSS-REFERENCE TO RELATED APPLICATIONS

This application is a continuation application under 35 U.S.C. § 111 (a) of international Application No. PCT/KR2021/012947, filed on Sep. 23, 2021, which claims priority to Korean Patent Application No. 10-2020-0149425, filed on Nov. 10, 2020, the disclosures of which are incorporated by reference herein in their entireties.

BACKGROUND

1. Field

The disclosure relates to a dehumidification device, and more specifically, to a dehumidification device for detecting installation of a water collection container.

2. Description of the Related Art

In the case of a dehumidification device having a heat exchanger, a water collection container may be disposed to collect condensation water discharged from the heat exchanger. The existing dehumidification devices may be provided with a sensor for detecting the level of condensation water in the water collection container.

Existing sensors use a floating sensor in a water collection container, and in response to the level of water rising and falling, the floating sensor also rises and falls, so there is a need for the water collection container to have a tall height.

In addition, when the level of water is detected using a sensor, there is a need for a separate sensor for detecting whether the water collection container is installed or removed.

SUMMARY

Aspects of embodiments of the disclosure will be set forth in part in the description which follows and, in part, will be apparent from the description, or may be learned by practice of the presented embodiments.

According to an embodiment of the disclosure, a dehumidification device may include a main body including a treatment chamber; a heat exchanger configured to cool air discharged from the treatment chamber; a water collection container that is installable inside the main body so that water condensed by the heat exchanger is collected therein; and a sensing unit including a first terminal, a second terminal, and a third terminal, wherein the sensing unit is configured so that in response to the water collection container is installed inside the main body, the second terminal becomes electrically connected to the first terminal to thereby detect the installation of the water collection container inside the main body, and in response to a predetermined amount of water is collected in the water collection chamber while the water collection container is installed inside the main body, the third terminal becomes electrically connected to the first terminal through the water to thereby detect the predetermined amount of water being collected in the water collection chamber.

According to an embodiment of the disclosure, the sensing unit includes a connection terminal at one side of the water collection container to electrically connect the first terminal to the second terminal in response to the water collection container is installed in the main body.

According to an embodiment of the disclosure, the sensing unit includes a plurality of electrode members at the one side of the water collection container, wherein the plurality of electrode members include a first electrode member that becomes electrically connected to the first terminal in response to the water collection container is installed in the main body, and a second electrode member that becomes electrically connected to the second terminal in response to the water collection container is installed in the main body, and the connection terminal is coupled to each of the first electrode member and the second electrode member.

According to an embodiment of the disclosure, the plurality of electrode members includes a third electrode member protruding into the water collection container to be electrically connected through the water to at least one of the first electrode member and the second electrode member in response to the predetermined amount of water is collected in the water collection chamber, wherein the third electrode member becomes electrically connected to the third terminal in response to the water collection container is installed in the main body, to detect the predetermined amount of water being collected in the water collection container, and at least one of the first electrode member and the second electrode member protrudes into the water collection container to be electrically connected to the third electrode member through the water in response to the predetermined amount of water is collected in the water collecting container.

According to an embodiment of the disclosure, the first electrode member and the second electrode member are formed at different heights.

According to an embodiment of the disclosure, the sensing unit includes a processor configured to output an electrical signal to the first terminal, and receive an electrical signal output from at least one of the second terminal and the third terminal.

According to an embodiment of the disclosure, the dehumidification device further includes a display configured to receive an electrical signal from the processor and display information about the predetermined amount of the water being collected in the water collection container.

According to an embodiment of the disclosure, the sensing unit includes a terminal case provided on an upper side of the first terminal, the second terminal, and the third terminal to cover the first terminal, the second terminal, and the third terminal, wherein the first terminal, the second terminal, and the third terminal each include a contact portion that is in contact with a respective one of the plurality of electrode members in response to the water collection container is installed inside the main body, and the terminal case includes a separation preventing portion configured to press the contact portions from an upper side of the contact portions, to prevent the contact portions from being separated.

According to an embodiment of the disclosure, the dehumidification device further includes a base plate disposed below the water collection container, and the water collection container includes an opening formed in an upper portion of the water collection container, and through which to collect water discharged from inside of the main body, and a guide duct connecting the opening to the base plate so that water discharged from the opening flows to the base plate.

According to an embodiment of the disclosure, the guide duct is formed to be inclined downward from the opening to the base plate, and the water passed through the guide duct is stored in the base plate.

According to an embodiment of the disclosure, the dehumidification device further includes a cover plate disposed above the water collection container and coupled to the base plate to cover the water collection container; a water storage area formed between the base plate and the cover plate; and a water storage sensor coupled to the cover plate and protruding into the water storage area to detect water stored in the water storage area.

According to an embodiment of the disclosure, the dehumidification device further includes a water storage passage formed to be inclined downward so that the water discharged from the opening flows from the guide duct to the water storage area.

According to an embodiment of the disclosure, the dehumidification device further includes a display on which information about the stored water is displayed upon the water stored in the water storage area being detected by the water storage sensor.

According to an embodiment of the disclosure, the dehumidification device further includes a door coupled to the main body to open and close the treatment chamber, and an opening/closing detection sensor disposed at a lower side of the door to detect the opening and the closing of the door, wherein upon the predetermined amount of the water being detected through the third electrode member, power flowing to the plurality of electrode members is cut off.

According to an embodiment of the disclosure, upon the door being detected by the opening/closing detection sensor as being opened and then closed, the power is supplied to the plurality of electrode members.

BRIEF DESCRIPTION OF THE DRAWINGS

These and/or other embodiments of the disclosure will become apparent and more readily appreciated from the following description of the embodiments, taken in conjunction with the accompanying drawings of which.

DETAILED DESCRIPTION

Figure 1:
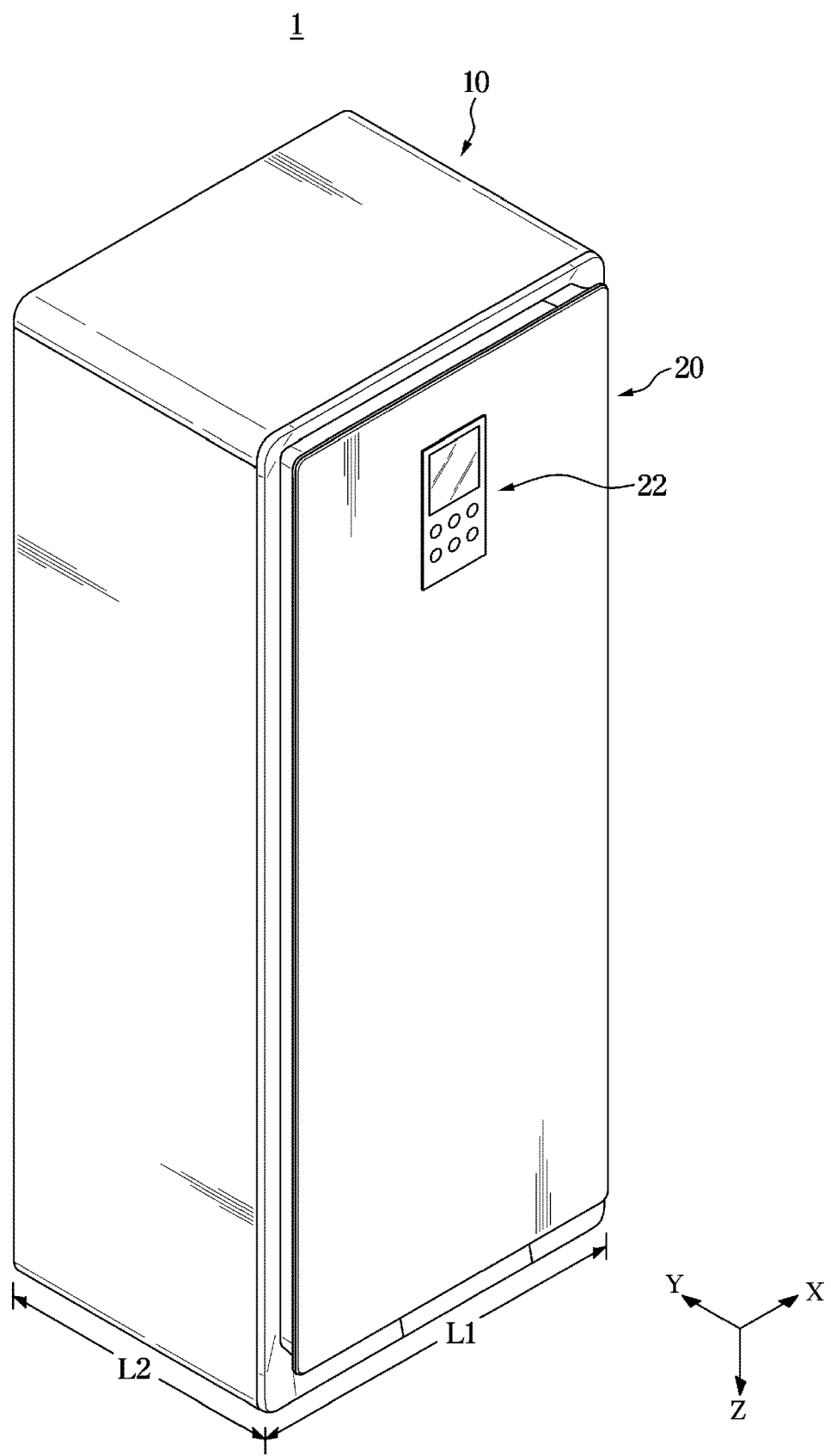
FIG. 1 is a view illustrating a dehumidification device according to an embodiment of the disclosure.

The embodiments set forth herein and illustrated in the configuration according to the disclosure are only the most preferred embodiments and are not representative of the full the technical spirit according to the disclosure, so it should be understood that they may be replaced with various equivalents and modifications at the time according to the disclosure.

Throughout the drawings, like reference numerals refer to like parts or components.

The terminology used herein is for the purpose of describing particular embodiments only and is not intended to restrict and/or limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings according to the disclosure. Descriptions shall be understood as to include any and all combinations of one or more of the associated listed items when the items are described by using the conjunctive term "~ and/or ~," or the like.

Meanwhile, in this specification, the terms "front", "rear", "left", and "right" are defined based on the drawings, and the terms may not restrict the shape and position of the respective components.

Figure 2:
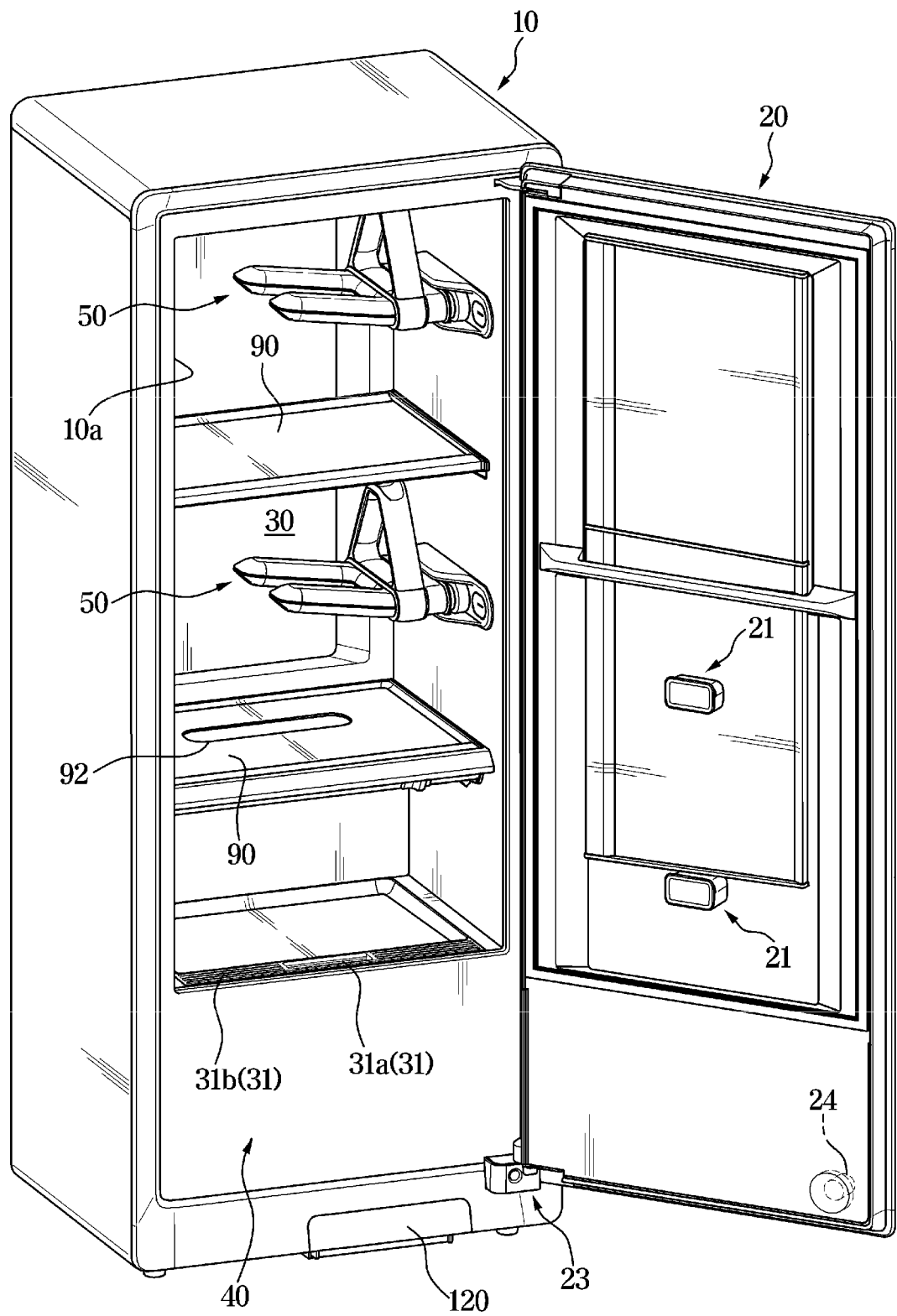
FIG. 2 is a perspective view illustrating the dehumidification device shown in FIG. 1 with a door opened according to an embodiment of the disclosure.

Specifically, as shown in FIGS. 1 and 2, the direction in which an inner surface of a dehumidification device is viewed when a door is opened may be defined as front, and based on this, rear, left and right, and upper and lower sides may be defined.

Embodiments of the disclosure provide a dehumidification device capable of detecting whether a water collection container is accommodated while detecting the level of water of the water collection container.

Embodiments of the disclosure provide a dehumidification device capable of reducing the production cost and material cost and including a water collection container designed to be in a compact structure.

Embodiments of the disclosure provide a dehumidification device having a longer use cycle of a sensing unit.

According to an aspect of the disclosure, a sensor installed in a water collection container can measure whether the water collection container is accommodated while measuring the level of level of water in the water collection container.

According to an aspect of the disclosure, the production and material costs can be reduced, and the water collection container may be designed in a compact size.

According to an aspect of the disclosure, the use cycle of a sensor for detecting the level of level of water in a water collection container is lengthened, such that the maintenance costs can be reduced.

Hereinafter, embodiments according to the disclosure will be described in detail with reference to the accompanying drawings.

Dehumidification devices may include various devices for dehumidifying a certain space, such as a clothes care device or a shoe care device, but for the sake of convenience of description, the following description will be made in relation to a shoe care device.

Figure 3:
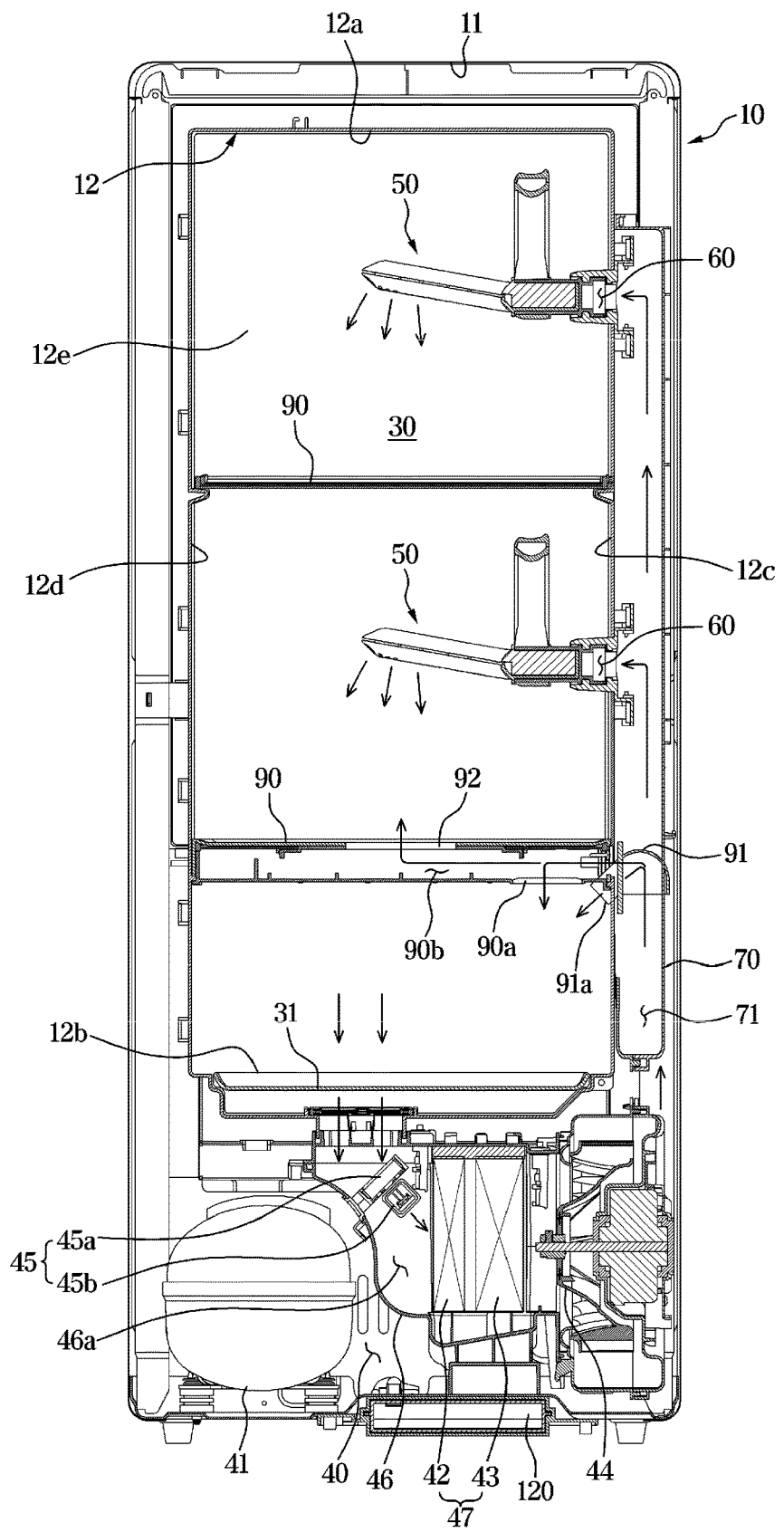
FIG. 3 is a cross-sectional view illustrating the dehumidification device shown in FIG. 1 viewed from the front according to an embodiment of the disclosure.

FIG. 1 is a view illustrating a dehumidification device according to an embodiment of the disclosure. FIG. 2 is a perspective view illustrating the dehumidification device shown in FIG. 1 with a door opened. FIG. 3 is a cross-sectional view illustrating the dehumidification device shown in FIG. 1 viewed from the front;

Referring to FIGS. 1 to 3, a shoe care device 1 may include a main body 10 forming the external appearance and a door 20 rotatably coupled to the main body 10.

The main body 10 may be provided in a rectangular parallelepiped shape with an open front side. An opening 10a may be formed on the open front side of the main body 10. The door 20 may be rotatably coupled to the main body 10 to open and close the open front of the main body 10. The door 20 may be coupled to the main body 10 through a hinge 23 or the like.

The door 20 may include a hanging member 21 provided on a surface facing the inside of a treatment chamber 30, which in this embodiment is a shoe care chamber 30. The hanging member 21 may be provided in at least one unit thereof. The hanging member 21 may be provided to hang a handle of a shoe support device 50, which will be described below, so as to easily store the shoe support device 50. However, the hanging member 21 is not limited thereto and may be used for hanging other configurations.

The door 20 may further include a display 22 provided on the front of the shoe care device 1. The user may set a care course suitable for shoes on the display 22 according to the type of shoes to be cared for. Through this, the temperature and humidity of the shoe care chamber 30 may be adjusted to reduce damage to shoes.

An opening/closing detection sensor 24 for detecting opening/closing of the door 20 may be provided on a lower portion of the door 20. The opening/closing detection sensor 24 may be a reed switch. However, it is not limited thereto and may include various types of sensors. When the opening/closing detection sensor 24 is a reed switch, magnetic force may be maintained when the door is closed, and magnetic force may be lost when the door is opened. Through this, a processor 200 (FIG. 9) may determine whether the door 20 is opened or closed. In the drawing, the opening/closing detection sensor 24 is illustrated as being located on the lower portion of the door 20, but is not limited thereto and may be disposed in various locations. In addition, an additional opening/closing detection sensor 24 may be disposed inside the main body 10.

The main body 10 may include an outer case 11 and an inner case 12 disposed inside the outer case 11. The main body 10 may include a shoe support device 50 provided inside the shoe care chamber 30 to support shoes. The inner case 12 may be referred to as a case.

The main body 10 may be formed such that a front surface extending in a first direction X has a length different from that of a side surface extending in a second direction Y. That is, the length L1 of the front surface may be longer than the length L2 of the side surface. Due to this, even in the case of a narrow entrance, the shoe care device 1 may be easily installed. The length of the front surface may be the first length L1, and the length of the side surface may be the second length L2.

The main body 10 may include a machine room 40 provided with a heat exchanger 47 for dehumidifying or heating air inside the shoe care chamber 30.

The shoe care chamber 30 may form a space in which shoes are accommodated. The shoe care chamber 30 may include an upper surface 12a, a lower surface 12b, a left surface 12c, a right surface 12d, and a rear surface 12e provided in the inner case 12. The shoe care chamber 30 may be provided inside the inner case 12. The shoe care chamber 30 may be referred to as a treatment room 30.

The inner case 12 may include a frame (not shown) provided to support the upper surface 12a, the lower surface 12b, the left surface 12c, the right surface 12d, and the rear surface 12e.

The shoe support device 50 may be installed on the left surface 12c or right surface 12d of the shoe care chamber 30. That is, the shoe support device 50 may be installed such that the side of the shoe is visible when viewed from the front of the shoe care device 1. Due to this, the side surface may be formed with a relative short length.

The shoe support device 50 may be separably installed in the shoe care chamber 30. At least one of the shoe support device 50 may be provided. The shoe support device 50 may be formed in a shape around which a shoe may be inserted.

A water collection container 120 separably provided on the main body 10 may be installed in a lower portion of the main body 10. The water collection container 120 may be disposed below the shoe care chamber 30.

The water collection container 120 may be provided to facilitate disposal of condensation water by the heat exchanger 47.

The machine room 40 may be provided at a lower side of the main body 10. The machine room 40 may be provided below the shoe care chamber 30. The water collection container 120 may be provided below the machine room 40.

The heat exchanger 47 may be provided to dehumidify and heat the air inside the shoe care chamber 30 as needed.

The heat exchanger 47 may be installed to supply heated air into the shoe care chamber 30. The heat exchanger 47 may include an evaporator 42, a condenser 43, and a compressor 41 through which a refrigerant circulates, and may be provided to dehumidify and heat air.

In the evaporator 42 of the heat exchanger 47, the refrigerant evaporates while absorbing latent heat from the surrounding air, so that moisture in the air may be condensed and removed.

When the refrigerant, transmitted through the compressor 41, is condensed in the condenser 43 via, the refrigerant may release latent heat toward the surrounding air, thereby heating the surrounding air.

The evaporator 42 and the condenser 43 perform a heat exchange function, so that the air introduced into the machine room 40 by a blowing fan 44 may be dehumidified and heated by sequentially passing through the evaporator 42 and the condenser 43.

The blowing fan 44 may be provided as a centrifugal fan that suctions air in an axial direction and discharges air toward a side duct. However, it is not limited thereto.

The heat exchanger 47 installed in the machine room 40 may include a connection duct 46 connecting the evaporator 42, the condenser 43, and the blowing fan 44, and the connection duct 46 may be connected to the shoe care chamber 30 to form a connection passage 46a that circulates air between the shoe care chamber 30 and the connection duct 46.

The shoe care device 1 may further include a water supply container (not shown), a steam generating device (not shown), and a steam spray device (not shown). The water supply container may be disposed below the shoe care chamber 30. Water in the water supply container may be supplied to the steam generating device and used to form steam. The water supply container may be installed to be separable from the main body so that water replenishment is facilitated.

The steam generating device may be provided in the machine room 40 to receive water from the water supply container to generate steam.

The steam generating device may be connected to the water supply container to receive water and generate steam, and include a steam supply pipe (not shown) for guiding the generated steam to the steam spraying device (not shown).

The evaporator 42, the condenser 43, and the blowing fan 44 may be arranged in the first direction X such that air flows in the first direction X. In addition, the steam generating device may also be arranged along the first direction. The arrangement in the first direction X may allow the side surface to have a reduced length, thereby facilitating installation on the entrance. The shoe care device 1 may further include a deodorizing device 45. The deodorizing device 45 may be disposed within the machine room 40. The deodorizing device 45 may be disposed in the connection duct 46 to remove odors from the air passed through the shoe care chamber 30. In the drawing, the deodorizing device 45 is illustrated as being provided on the right side of the blowing fan 44, but is not limited thereto and may also be provided on the left side of the blowing fan 44.

The deodorizing device 45 may include a deodorizing filter 45a and a germicidal lamp 45b. The deodorization filter 45a may include a ceramic filter. The germicidal lamp 45b may include an ultraviolet lamp. However, it is not limited thereto, and the deodorizing filter 45a may include various filters as long as it can remove odors in the air, and the germicidal lamp 45b may also include various devices as long as it can sterilize germs.

The shoe care chamber 30 may include at least one mounting plate 90. The mounting plate 90 may be disposed in the shoe care chamber 30 to mount shoes thereon.

The mounting plate 90 may include a duct plate 90. The duct plate 90 may include an internal passage 90b as shown in FIG. 3. Heated air passing through the internal passage 90b may be individually injected toward the shoes from an injection port 90a of the duct plate 90 and an injection port 91a of a circular duct 91. In addition, heated air from the inside the internal passage 90b may be introduced into the shoe care chamber 30 through an inlet of the shoe support device 50.

An inlet hole 92 for supplying heated air into the shoe care chamber 30 may be formed on an upper wall of the duct plate 90. The inlet hole 92 may also be formed on the lower wall of the duct plate 90.

The shoe care chamber 30 may further include a supply port 60 and an outlet 31.

The supply port 60 may be formed on a sidewall of the inner case 12. That is, the supply port 60 may be formed on the left surface 12c of the shoe care chamber 30. However, it is not limited thereto, and the supply port 60 may be formed on the right surface 12d. At least one of the supply port 60 may be formed, and may supply heated air into the shoe care chamber 30 to dry shoes. The supply port 60 may be provided in a circular shape. However, it is not limited thereto, and the supply portion 60 may include various shapes, such as quadrangles and polygons, as long as it can dry shoes by supplying heated air into the shoe care chamber 30.

The outlet 31 may be disposed in a front portion of the lower surface 12b of the shoe care chamber 30. However, it is not limited thereto, and the outlet 31 may be disposed in rear and side portions of the lower surface 12b of the shoe care chamber 30. Air used to dry shoes in the shoe care chamber 30 may flow through the outlet 31 to the connection duct 46 to be described below.

The outlet 31 may include a discharge hole 31a and a discharge grille 31b. However, the outlet 31 is not limited thereto, and the above configuration may be omitted as long as heated air can be smoothly supplied to the connection duct 46.

The connection duct 46 may be connected to the side duct 70 and the outlet 31 of the shoe care chamber 30. One end of the connection duct 46 may be connected to the side duct 70, and the other end of the connection duct 46 may be connected to the outlet 31. Air introduced through the outlet 31 may be dehumidified and then introduced back into the shoe care chamber 30 through the side duct 70 and the supply port 60.

The side duct 70 may be provided outside the sidewall of the inner case 12 in the second direction Y such that the front surface of the shoe care device 1 is long and the side surface of the shoe care device 1 is short. One end of the side duct 70 may be connected to the at least one supply port 60, and the other end of the side duct 70 may be connected to the connection duct 46. The side duct 70 may form a side passage 71 through which heated air flows to the supply port 60.

The shoe care chamber 30 may further include the shoe support device 50.

The shoe support device 50 may be separably mounted on the inner surface of the sidewall of the inner case 12. That is, the shoe support device 50 may be coupled to the left surface 12c of the shoe care chamber 30. However, it is not limited thereto, and the shoe support device 50 may be disposed on the right surface 12d of the shoe care chamber 30 as long as heated air is supplied thereto.

Since the shoe support device 50 is separable from the shoe care chamber 30, the shoe support device 50 may be separated when a shoe mounting device (not shown) for long boots to be described below is installed in the shoe care chamber 30 or when shoes are placed on the mounting plate 90, for spatial utilization.

Figure 4:
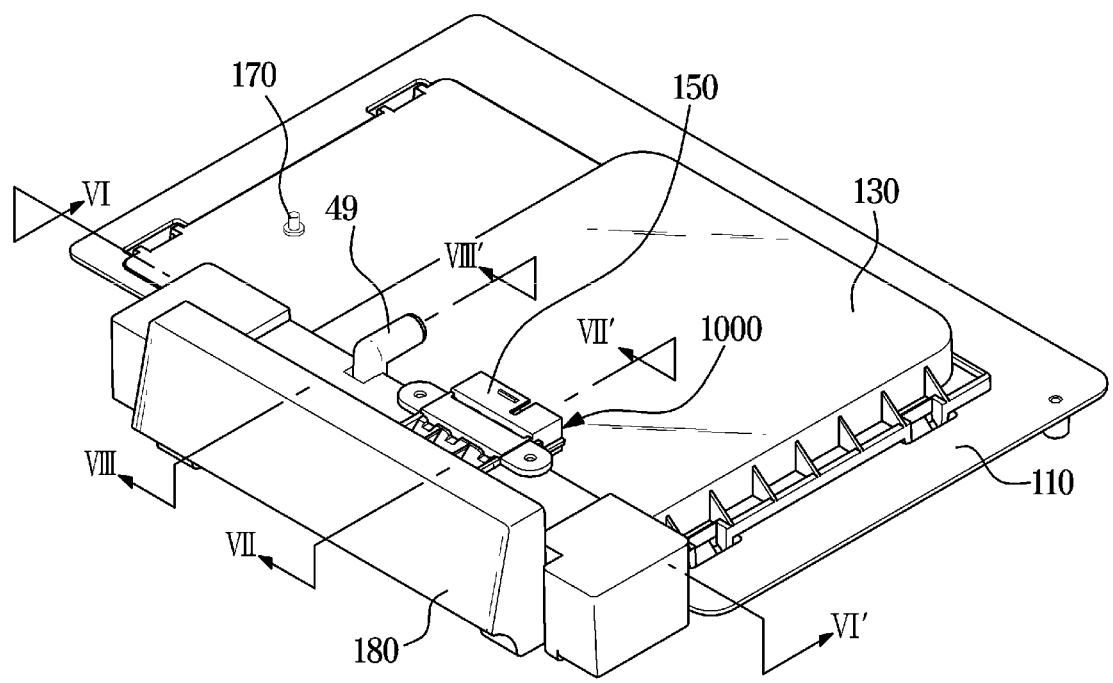
FIG. 4 is a view illustrating main components of the dehumidification device shown in FIG. 1 according to an embodiment of the disclosure.
Figure 5:
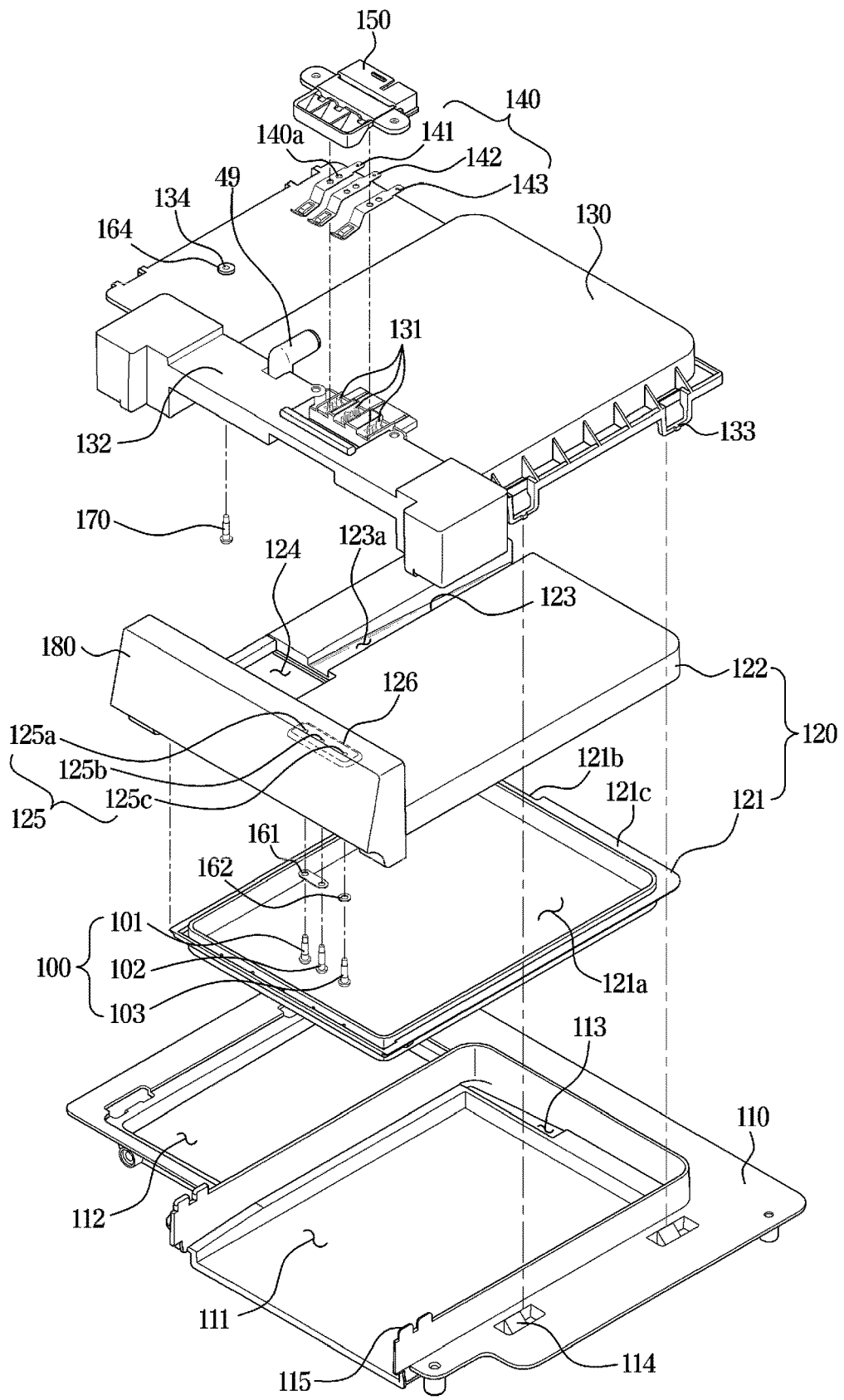
FIG. 5 is an exploded view illustrating the main components of the dehumidification device shown in FIG. 4 according to an embodiment of the disclosure.

FIG. 4 is a view illustrating main components of the dehumidification device shown in FIG. 1. FIG. 5 is an exploded view illustrating the main components of the dehumidification device shown in FIG. 4.

Referring to FIGS. 4 and 5, the shoe care device may include a base plate 110 supporting the water collection container 120 from a lower side and a cover plate 130 covering the water collection container 120 from an upper side.

The base plate 110 may include a seating area 111 on which the water collection container 120 is seated, a water storage area 112 in which water overflowed from the water collection container 120 is stored, a water storage passage 113 allowing water overflowed from the water collection container 120 to flow into the water storage area 112, a first coupling protrusion 114 protruding in a first direction to be coupled with the cover plate 130, and a second coupling protrusion 115 protruding upward to be coupled with a lower portion of the water collection container 120.

The seating area 111 may be formed to correspond to a lower case 121 of the water collection container 120 such that the lower case 121 may be seated thereon. Accordingly, the seating area 111 may be provided in a substantially quadrangular shape.

The water storage area 112 may be provided such that water discharged from an opening 124 provided at the upper side of the water collection container 120 is stored after flowing through the water storage passage 113. An upper side of the water storage area 112 may be covered by the cover plate 130. A water storage sensor 170 to be described below may be provided to detect whether overflowed water is present in the water storage area 112 so that the result is displayed on the display 22.

The water storage passage 113 may be provided to slant downward in a direction from the seating area 111 to the water storage area 112. Water falling downward through a drain hole 121*b* may flow into the water storage area 112 through the water storage passage 113.

The first coupling protrusion 114 may be coupled to a coupling rib 133 provided on the cover plate 130 to prevent the base plate 110 and the cover plate 130 from being separated from each other. The second coupling protrusion 115 may be coupled to the lower case 121.

The cover plate 130 may include a fastening protrusion 131 provided to allow a terminal 140 to be coupled thereto, a strength reinforcement portion 132 reinforcing the strength of a front end portion of the cover plate 130, the coupling rib 133 coupled to the first coupling protrusion 114, a coupling hole 134 into which the water storage sensor 170 is inserted, and a support portion 135 (FIG. 7) supporting the terminal 140.

The fastening protrusion 131 may protrude upward such that the terminal 140 may be coupled to the cover plate 130. The fastening protrusion 131 may be coupled to a fastening hole 140*a* provided in the terminal 140 to fix the terminal 140 to the cover plate 130. The fastening protrusion 131 may be provided in one pair to be coupled with one terminal 140. The fastening protrusions 131 may be provided in a plurality of pairs. As shown in the drawing, the terminal 140 is provided in three units thereof, and the fastening protrusions 131 may be provided in three pairs along the left-right direction (the X direction). However, the number of fastening protrusions 131 is not limited to that shown in the above examples or drawings, and the fastening protrusions 131 may be provided in various numbers and shapes corresponding to the number of terminals 140.

The strength reinforcement portion 132 may be provided on the front end portion of the cover plate 130. The strength reinforcement portion 132 may protect various components, such as an electrode member 100, from various components of the shoe care device provided on the upper side of the cover plate 130. The shape of the strength reinforcement portion 132 is not limited to that shown in the drawings.

The coupling rib 133 may be formed to correspond to the first coupling protrusion 114 of the base plate 110. The coupling rib 133 may protrude downward. The coupling rib 133 may be provided in plural.

The coupling hole 134 may be provided to allow the water storage sensor 170 passes therethrough. A fixing member 164 coupled to the water storage sensor 170 and fixing the water storage sensor 170 may be provided on the upper side of the coupling hole 134. The support portion 135 will be described below.

The shoe care device may include the water collection container 120 and a sensing unit 1000. The water collection container 120 and the sensing unit 1000 may be disposed between the base plate 110 and the cover plate 130.

The water collection container 120 may include the lower case 121 and an upper case 122. The upper case 122 and the lower case 121 may be provided in a substantially quadrangular shape. However, the shapes of the upper case 122 and the lower case 121 are not limited thereto. In a state in which the water collection container 120 is mounted on the body 10, the upper case 122 and the lower case 121 and components coupled thereto may not be mounted on the main body 10. On the other hand, even after the water collection container 120 is separated from the main body 10, the cover plate 130 and the base plate 110 are mounted on the main body 10, components coupled to the cover plate 130 and the base plate 110 also remain coupled to the main body 10.

The lower case 121 may include a water collection area 121*a* and the drain hole 121*b*. The water collection area 121*a* may be connected to the heat exchanger 47 to store water discharged from the heat exchanger 47 through a drain pipe 49. The water collection area 121*a* may be provided in a shape corresponding to that of the lower case 121. The drain hole 121*b* may be formed adjacent to an upper end of an extension wall 121*c* that extends in an upper side direction of the lower case 121. Water drained from the opening 124 and a guide passage 123*a* may flow through the drain hole 121*b* sequentially to the water storage passage 113, and then flow to the water storage area 112.

The upper case 122 may be provided to cover the upper side of the lower case 121.

The shoe care device may include the opening 124 provided in the upper portion of the upper case 122, a guide duct 123 connected to the opening 124, an insertion hole 125 provided in the upper portion of the upper case 122 and into which the electrode member 100 is inserted, and a stepped portion 126 having a step difference with the upper surface of the upper case 122.

The opening 124 may allow water overflowing from the water collection container 120 to flow to the guide duct 123. The guide duct 123 may form the guide passage 123*a*. The insertion hole 125 may be provided in plural. The insertion holes 125 may include a first insertion hole 125*a*, a second insertion hole 125*b*, and a third insertion hole 125*c*. A first electrode member 101 may be inserted into the first insertion hole 125*a*, a second electrode member 102 may be inserted into the second insertion hole 125*b*, and a third electrode member 103 may be inserted into the third insertion hole 125*c*. The number of insertion holes 125 is not limited to that shown in the drawings and may be provided corresponding to the number of electrode members 100.

The shoe care device may include the sensing unit 1000 for detecting the level of water in the water collection container 120 and a water storage sensor 170 for detecting the level of water in the water storage area 112. The sensing unit 1000 may include the electrode member 100, the terminal 140, and a connection terminal 161.

The electrode member 100 may be mounted on one side of the water collection container 120. Specifically, the electrode member 100 may be mounted on the upper side of the water collection container 120. The electrode member 100 may be provided in plural. The electrode member 100 may include the first electrode member 101, the second electrode member 102, and the third electrode member 103. In the drawing, the plurality of electrode members 100 are illustrated as protruding to the inside of the water collection container 120, but are not limited thereto, and at least one of the first electrode member 101 or the second electrode member 102 and the third electrode member 103 may protrude to the inside of the water collection container 120, as will be described below, to thereby detect whether the water collection container 120 is accommodated in the main body 10 while detecting the level of water in the water collection container 120. That is, at least one of the first electrode member 101 or the second electrode member 102 may protrude to the inside of the water collection container 120, and the other one of the first electrode member 101 and the second electrode member 102 may not protrude to the inside of the water collection container 120. The number of electrode members 100 is not limited to the above example and may include two or less or four or more. The plurality of electrode members 100 may have the same height, but it is not limited thereto. For example, the heights of the first electrode member 101 and the third electrode member 103 may be formed to be the same, and the second electrode member 102 may be longer or shorter than the first electrode member 101 and the third electrode member 103. Conversely, the heights of the second electrode member 102 and the third electrode member 103 may be the same, and the first electrode member 101 may be longer or shorter than the second electrode member 102 and the third electrode member 103.

The electrode member 100 may be provided in a rod shape. That is, the electrode member 100 may include an electrode rod. However, the shape of the electrode member 100 is not limited to the above example and may include various shapes. In addition, the first electrode member 101 and the second electrode member 102 are integrally formed with each other.

The terminal 140 may be disposed on one side of the electrode member 100 so as to be in contact with the electrode member 100. Specifically, the terminal 140 may be disposed on the upper side of the electrode member 100. The terminal 140 may be provided in plural. The terminal 140 may include a first terminal 141, a second terminal 142, and a third terminal 143. The terminal 140 may include a fastening hole 140a through which the fastening protrusion 131 is inserted. The number of fastening holes 140a may be provided corresponding in number to the number of the fastening protrusions 131.

Figure 6:
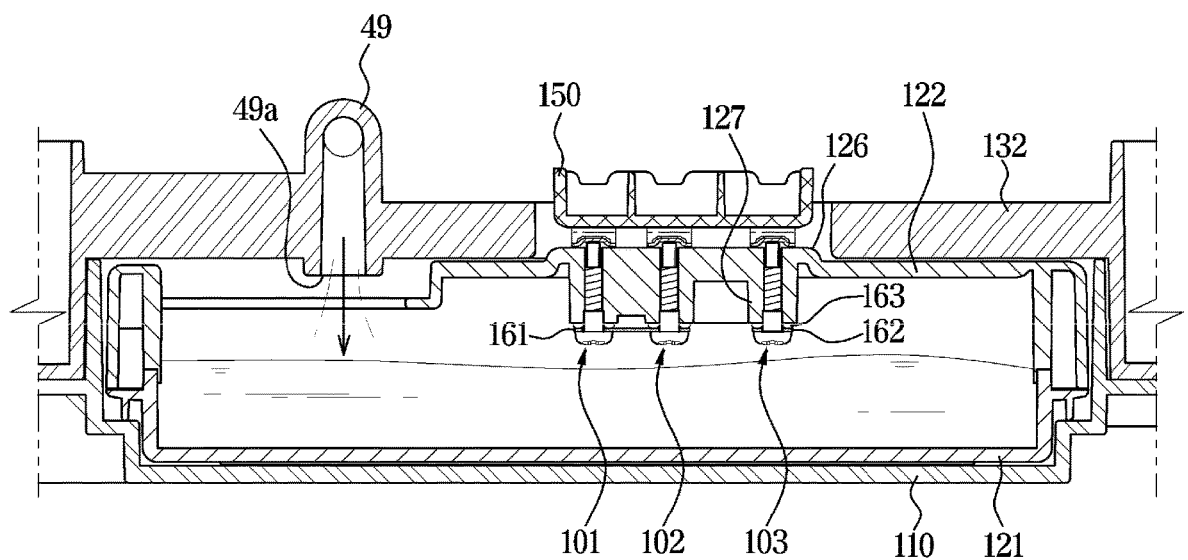
FIG. 6 is a view illustrating the main components of the dehumidification device shown in FIG. 4, taken along line VI-VI', according to an embodiment of the disclosure.

The connection terminal 161 may be provided between the electrode member 100 and the upper case 122. Specifically, the connection terminal 161 may be coupled to the first electrode member 101 and the second electrode member 102 to conduct electricity between the first electrode member 101 and the second electrode member 102. A washer 162 may be disposed between the third electrode member 103 and a protruding portion 127 (FIG. 6).

The shoe care device may include a terminal case 150 provided to cover the terminal 140, and a handle 180 mounted on the front end portion of the upper case 122.

The terminal case 150 may cover the terminal 140 from the upper side. The terminal case 150 may cover the upper portion and left and right side portions of the terminal 140 to prevent the terminal 140 from being damaged.

The handle 180 may be disposed on the front end portion of the water collection container 120 to be used by the user for withdrawing or mounting the water collection container 120 from or to the main body 10. The shape of the handle 180 is not limited to that shown in the drawings.

Figure 7:
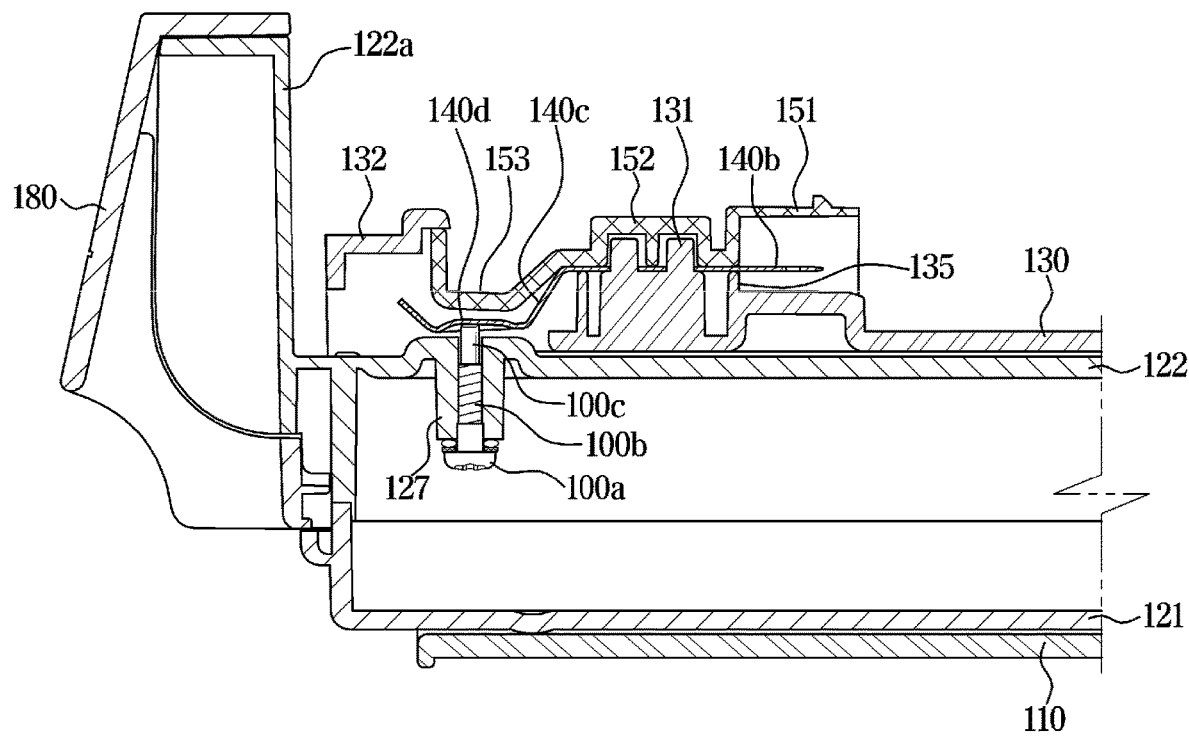
FIG. 7 is a view illustrating the main components of the dehumidification device shown in FIG. 4, taken along line VI-VII', according to an embodiment of the disclosure.

FIG. 6 is a view illustrating the main components of the dehumidification device shown in FIG. 4, taken along line VI-VI'. FIG. 7 is a view illustrating the main components of the dehumidification device shown in FIG. 4, taken along line VII-VII'.

Referring to FIGS. 6 and 7, the terminal 140 may include a connection portion 140b connected to the main body 10, a contact portion 140d being in contact with the electrode member 100, and an inclined portion 140c provided between the connection portion 140b and the contact portion 140d.

The electrode member 100 may include a first electrode portion 100a, a second electrode portion 100b, and a third electrode portion 100c. The first electrode portion 100a may be provided on the lowermost side to form a head 100a. A part of the first electrode portion 100a may be inserted into the protruding portion 127. The second electrode portion 100b may be provided between the first electrode portion 100a and the third electrode portion 100c and may extend in one direction. The second electrode portion 100b may be inserted into and installed inside the protruding portion 127. The third electrode portion 100c may be provided on the uppermost side among the plurality of electrode portions. At least a part of the third electrode portion 100c may be inserted into and installed inside the protruding portion 127 and the stepped portion 126 and may be in contact with the terminal 140. The third electrode portion 100c may be in contact with the terminal 140 to transmit and receive electrical signals therebetween.

The connection terminal 161 may be provided between the electrode member 100 and the protruding portion 127 of the upper case 122. A packing member 163 may be disposed between the connection terminal 161 and the protruding portion 127.

According to an embodiment of the disclosure, an electrical signal may be transferred from the main body 10 to the first terminal 141. In this case, without the water collection container 120 being mounted on the main body 10, the first terminal 141 and the first electrode member 101 may not be in contact with each other, and thus an electrical signal may not be transmitted to the first electrode member 101.

Conversely, in response to the water collection container 120 being mounted on the main body 10, the first terminal 141 may come in contact with the first electrode member 101, and an electrical signal may be transmitted to the first electrode member 101. The electrical signal flowing through the first electrode member 101 may flow to the second electrode member 102 via the connection terminal 161. The electrical signal flowing through the second electrode member 102 may flow to the second terminal 142. The electrical signal flowing through the second terminal 142 may flow back to the main body 10. That is, in response to the water collection container 120 being mounted on the main body 10, the electrical signal transmitted from the main body 10 to the first terminal 141 returns through the second terminal 142, and thus the shoe care device may recognize whether the water collection container 120 is mounted on the main body 10. Accordingly, whether the water collection container 120 is mounted may be displayed on the display 22 to be described below. In addition, without the water collection container 120 being mounted, the electrical signal may not return, and thus the display 22 may display that the water collection container 120 is not mounted.

While the shoe care device operates, the heat exchanger 47 may dehumidify the air inside the shoe care chamber 30. That is, the heat exchanger 47 may remove moisture discharged from the shoe care chamber 30. In this case, the heat exchanger 47 may produce condensation water. Condensation water produced through the heat exchanger 47 may be stored in the water collection container 120 through the drain pipe 49 and the drain hole 49a. While the shoe care device continues to operate, the level of water in the water collection container 120 may rise above a predetermined water level. In this case, the condensation water in the water collection container 120 and the electrode member 100 may come in contact with each other.

That is, the condensation water in the water collection container 120 may come in contact with the plurality of electrode members 100. As the first electrode member 101 receives an electrical signal from the main body 10, the electrical signal may be transmitted to the third electrode member 103 through water in the water collection container

120. Thus, both the second electrode member 102 and the third electrode member 103 may transmit an electrical signal to the main body 10. The main body 10 may detect the electrical signal and recognize that the level of water in the water collection container 120 is higher than or equal to a predetermined level of water. Accordingly, the rise in the level of water of the water collection container 120 may be indicated on the display 22 to be described below. That is, the display 22 may display an indication for emptying the water collection container 120. The user may visually recognize that the water stored in the water collection container 120 needs to be emptied.

As another embodiment, the second electrode member 102 and the third electrode member 103 may be formed longer than the first electrode member 101. That is, the heights of the second electrode member 102 and the third electrode member 103 may be greater than that of the first electrode member 101. In response to the condensation water in the water collection container 120 reaching a predetermined water level, the second electrode member 102 may come in contact with the condensation water. In this case, in response to the third electrode member 103 also coming in contact with the condensation water, the second electrode member 102, which continuously receives an electrical signal from the first electrode member 101 through the connection terminal 161, may transmit the electrical signal to the third electrode member 103 through the condensation water. Through this, the electrical signal may be supplied to the processor 200.

According to an embodiment of the disclosure, since the sensing unit 1000 may detect whether the water collection container 120 is accommodated in the main body 10 while detecting the level of water in the water collection container 120, an additional sensor is not required, and thus material costs may be reduced when manufacturing the dehumidification device. In addition, since the electrode member 100 does not need to have a long length, the water collection container 120 may be formed in a compact size.

The cover plate 130 may include the support portion 135. The support portion 135 may protrude upward. Accordingly, the support portion 135 may support the terminal 140.

The upper case 122 may include an extension portion 122a extending upward to be coupled with the handle 180.

The connection portion 140b may receive an electrical signal from the main body 10 or transmit an electrical signal to the main body 10. The connection portion 140b may be disposed at an upper side of the contact portion 140d. The contact portion 140d may receive an electrical signal from the electrode member 100 or transmit an electrical signal to the electrode member 100. The contact portion 140d may be provided at a lower side of the connection portion 140b. The inclined portion 140c may be provided between the connection portion 140b and the contact portion 140d to connect the connection portion 140b and the contact portion 140d.

The terminal case 150 may include a first portion 151, a second portion 152, and a third portion 153. The first portion 151 may cover the connection portion 140b of the terminal 140. Therefore, the connection portion 140b may be stably coupled to the main body 10 without being damaged. The second portion 152 may be provided between the first portion 151 and the third portion 153.

The third portion 153 may be provided adjacent to the contact portion 140d of the terminal 140 to cover the contact portion 140d. The third portion 153 may be provided at the upper side of the contact portion 140d to prevent the contact portion 140d from being bent upward and leaving the correct position. The third portion 153 may be referred to as a separation preventing portion 153.

Figure 8:
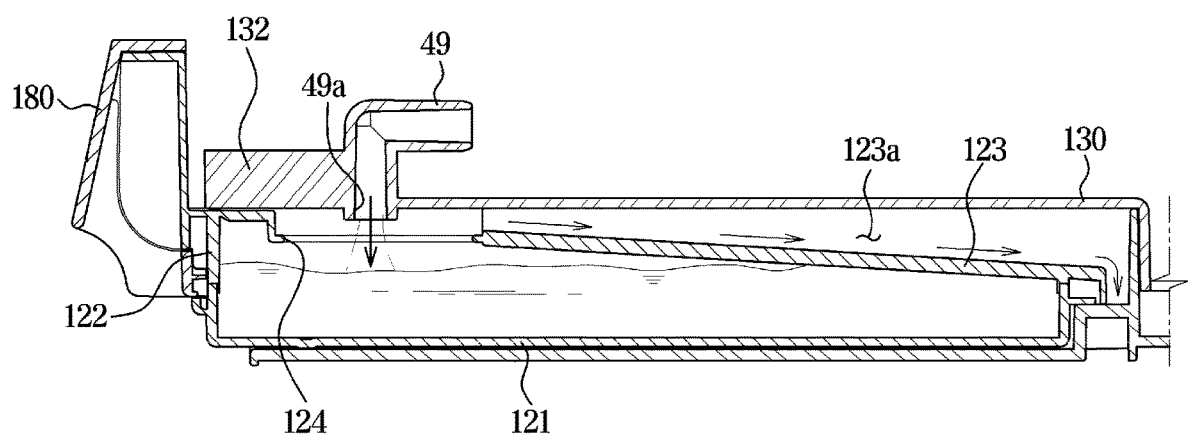
FIG. 8 is a view illustrating the main components of the dehumidification device shown in FIG. 4, taken along line VI-VII', according to an embodiment of the disclosure.

FIG. 8 is a view illustrating the main components of the dehumidification device shown in FIG. 4, taken along line VI-VII'.

Referring to FIG. 8, the user may not empty water stored in the water collection container 120 even after seeing the water empty indication on the display 22. In this case, while the shoe care device continues to operate, condensation water may be continuously stored in the water collection container 120 and the level of water may gradually rise. In response to the level of water in the water collection container 120 reaches a water level higher than the opening 124, the condensation water may overflow to the guide passage 123a formed by the guide duct 123. The guide duct 123 may be formed to slant downward from the front to the rear.

Referring to FIG. 5 together, the guide passage 123a may be connected to the water storage passage 113. That is, water flowing out of the opening 124 and into the guide passage 123a may flow into the water storage passage 113. Since the water storage passage 113 is also provided to slant downward, water flowing through the water storage passage 113 may flow into the water storage area 112. That is, water overflowing from the water collection container 120 may be stored in the water storage area 112.

The shoe care device may include a water storage sensor 170 for detecting water stored in the water storage area 112. The water storage sensor 170 may detect water in the water storage area 112 and allow the presence of water in the water storage area 112 to be displayed on the display 22. Accordingly, the user may recognize that the water collection container 120 needs to be emptied as soon as possible.

The water storage sensor 170 may include various types of sensors.

Figure 9:
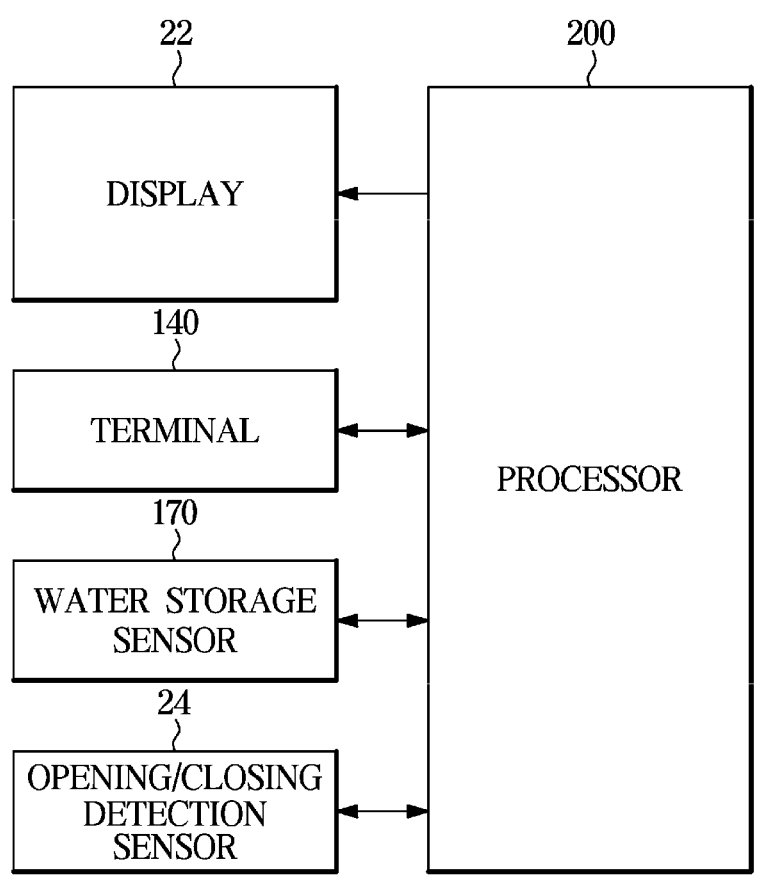
FIG. 9 is a control block diagram according to an embodiment of the disclosure.

FIG. 9 is a control block diagram according to an embodiment of the disclosure.

Referring to FIG. 9, the shoe care device may further include a processor 200. The processor 200 may transmit an electrical signal to the first terminal 141. As described above, upon the electrical signal not returning from the second terminal 142, the processor 200 may recognize that the electrical signal is not returned from the second terminal 142, and recognize that the water collection container 120 is not mounted. Accordingly, the processor 200 may control the display 22 to display whether the water collection container 120 is mounted on the display 22. Conversely, upon the electrical signal returning from the second terminal 142, the processor 200 may recognize that the water collection container 120 is mounted and allow the display 22 to display that the water collection container 120 is mounted.

As another example, upon the electrical signal returning to the processor 200 through the third electrode member 103 and the third terminal 143, the processor 200 may allow the display 22 to display that water at a level higher than or equal to a predetermined water level is stored in the water collection container 120. That is, the processor 200 may allow the display 22 to display a water empty indication.

In addition, the processor 200 may also allow the display 22 to display a water empty indication even upon water in the water storage area 112 being recognized by the water storage sensor 170. That is, the processor 200 may determine whether water is collected in the water storage area 112 through the water storage sensor 170 and upon determining that water is collected, allow the result to be displayed on the display 22. Accordingly, the user may identify that water in the water collection container 120 needs to be emptied.

In addition, the processor 200 may sense whether the door 20 is opened or closed by the opening/closing detection sensor 24 and supply or cut off power to the electrode member 100 as will be described below.

In the drawing, the processor 200 for controlling the terminal 140, the water storage sensor 170, the opening/closing detection sensor 24, and the display 22 is illustrated as one, but is not limited thereto, and the processors 200 for controlling the terminal 140, the water storage sensor 170, the opening/closing detection sensor 24, and the display 22 may be separately provided.

Figure 10:
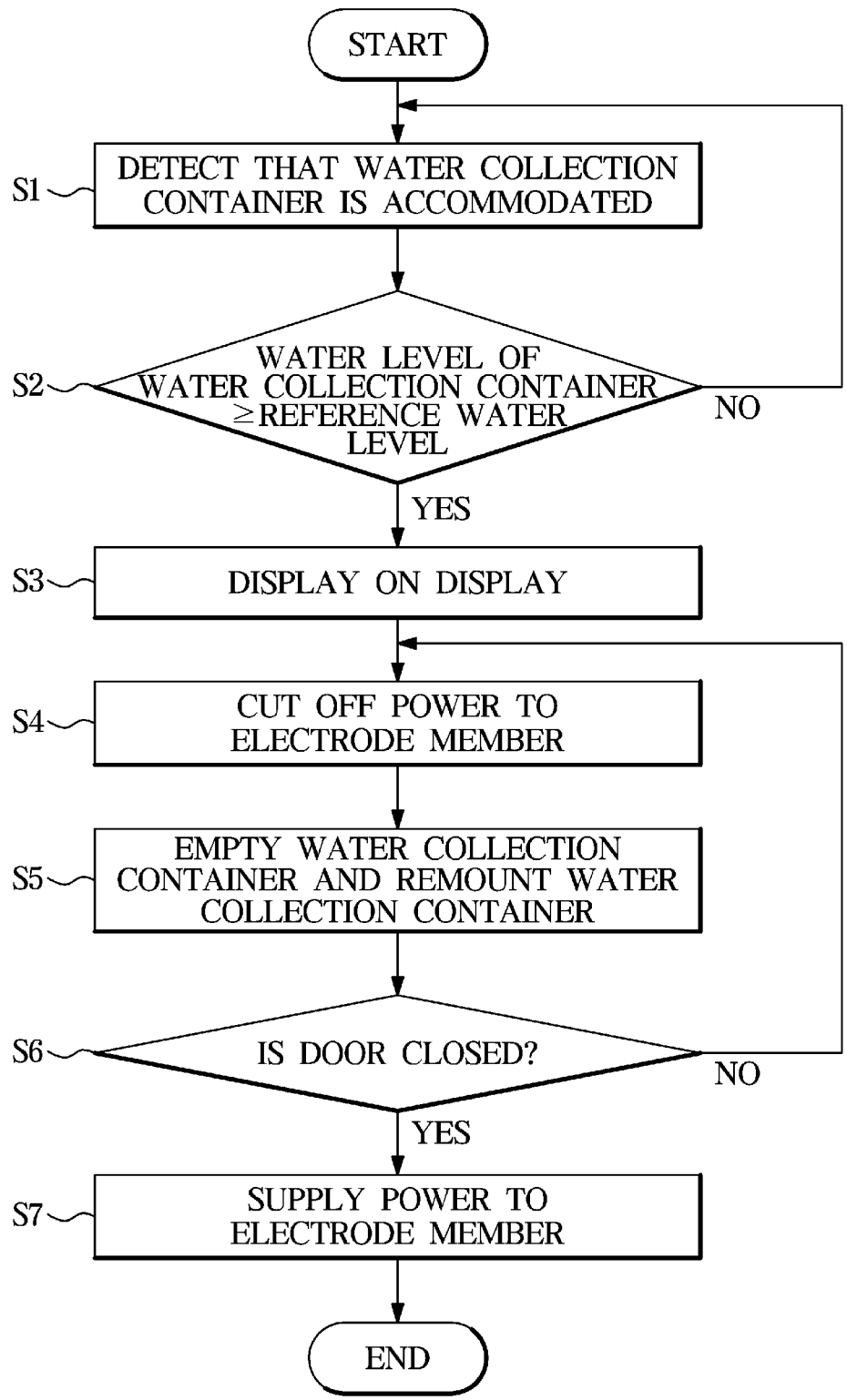
FIG. 10 is a control flow chart according to an embodiment of the disclosure.

FIG. 10 is a control flow chart according to an embodiment of the disclosure.

Referring to FIG. 10, upon detecting that the water collection container 120 is mounted on the main body 10 by the sensing unit 1000, (S1), it is detected whether the level of water in the water collection container 120 is higher than or equal to a predetermined reference water level (S2).

The shoe care device 1 may detect whether the plurality of electrode members 100 come in contact with water in the water collection container 120 and thus electricity conduction occurs between the plurality of electrode members 100. Specifically, the processor 200 may detect whether electricity conduction occurs between the first electrode member 101 and the third electrode member 103 or whether electricity conduction occurs between the second electrode member 102 and the third electrode member 103. That is, it may be detected whether electricity conduction occurs between the third member 103 and an electrode member between the first electrode member 101 and the second electrode member, which protrudes to the inside of the water collection container 120 at a large length. Through this, the processor 200 may allow the display 22 to display whether the level of water of the water collection container 120 is higher than or equal to a predetermined reference water level (S3). That is, the processor 200 may display a need to empty the water collection container 120 on the display 22, and the user may recognize the need.

In response to electricity conduction occurs between the plurality of electrode members 100, the processor 200 may cut off power to the sensing unit 1000 (S4). Specifically, the processor 200 may prevent current from flowing through the electrode member 100. Accordingly, corrosion of the electrode member 100 may be delayed, and material costs for replacing the electrode member 100 may be reduced.

The user may empty the water collection container 120, and then remount the water collection container 120 on the main body 10 (S5).

In response to the user remounts the water collection container and closes the door, the opening/closing detection sensor provided on the lower portion of the door may detect whether the door is closed (S6). That is, the processor 200 may determine whether the door is closed through the opening/closing detection sensor. The processor may, upon determining that the door is closed, supply power to the electrode member (S7).

According to an embodiment of the disclosure, power of the sensing unit 1000 may be cut off in response to the water in the water collection container 120 comes in contact with the electrode member 100 by exceeding a predetermined water level, and power may be supplied to the sensing unit 1000 only when the water in the water collection container 120 is emptied, and thus corrosion of the electrode member 100 may be delayed.

In addition, without a separate action other than an action of the user opening and closing the door 20 and emptying the water in the water collection container 120, power may be allowed to be re-supplied to the electrode member 100. Thus, user convenience may be increased.

According to an embodiment of the disclosure, there is provided a dehumidification device including a main body including a treatment chamber; a heat exchanger configured to cool air discharged from the treatment chamber; a water collection container accommodated inside the main body such that water condensed by the heat exchanger is collected therein, the water collection container including an opening formed in an upper portion of the water collection container and through which water in the water collection container is overflown, and a guide duct formed to slant downward such that the water overflown from the opening flows downward; and a sensing unit configured to detect a level of the water collected in the water collection container and detect whether the water collection container is accommodated; and a base plate including a water storage area, which is disposed below the water collection container to collect water flowing from the guide duct.

The guide duct may be formed to slant downward in a direction from the opening to the base plate.

The dehumidification device may further include a cover plate coupled to the base plate from an upper side of the base plate to form the water storage area; and a water storage sensor coupled to the cover plate while protruding into the water storage area to detect the water stored in the water storage area.

According to an embodiment of the disclosure, there is provided a method of controlling a dehumidification device, the method including detecting a water collection container accommodated in a main body based on whether electricity conduction occurs between a first electrode member and a second electrode member; determining whether electricity conduction occurs between at least one of the first electrode member or the second electrode member and a third electrode member; and upon electricity conduction occurring between the at least one of the first electrode member or the second electrode member and the third electrode member, cut off power to the first electrode member, the second electrode member, and the third electrode member.

The method may further include sensing whether a door provided on the main body is opened, sensing whether the door is closed, and in response to the door being closed, supplying power to the first electrode member, the second electrode member, and the third electrode member.

Although few embodiments according to the disclosure have been shown and described, the above embodiment is illustrative purpose only, and it would be appreciated by those skilled in the art that changes and modifications may be made in these embodiments without departing from the principles and scope according to the disclosure, the scope of which is defined in the claims and their equivalents.

What is claimed is:

1. A dehumidification device comprising:
a main body including a treatment chamber;
a heat exchanger configured to cool air discharged from the treatment chamber;
a water collection container that is installable inside the main body so that water condensed by the heat exchanger is collected therein; and
a sensing unit including a first terminal, a second terminal, and a third terminal,
wherein the sensing unit is configured so that:
in response to the water collection container being installed inside the main body, the second terminal becomes electrically connected to the first terminal to thereby detect the installation of the water collection container inside the main body, and in response to a predetermined amount of water being collected in the water collection chamber while the water collection container is installed inside the main body, the third terminal becomes electrically connected to the first terminal through the water to thereby detect the predetermined amount of water being collected in the water collection chamber.

2. The dehumidification device of claim 1, wherein the sensing unit includes:
a connection terminal at one side of the water collection container to electrically connect the first terminal to the second terminal in response to the water collection container is installed in the main body.

3. The dehumidification device of claim 2, wherein the sensing unit includes:
a plurality of electrode members at the one side of the water collection container,
wherein the plurality of electrode members includes:
a first electrode member that becomes electrically connected to the first terminal in response to the water collection container is installed in the main body, and
a second electrode member that becomes electrically connected to the second terminal in response to the water collection container is installed in the main body, and
the connection terminal is coupled to each of the first electrode member and the second electrode member.

4. The dehumidification device of claim 3, wherein the plurality of electrode members includes:
a third electrode member protruding into the water collection container to be electrically connected through the water to at least one of the first electrode member and the second electrode member in response to the predetermined amount of water is collected in the water collection chamber,
wherein the third electrode member becomes electrically connected to the third terminal in response to the water collection container is installed in the main body, to detect the predetermined amount of water being collected in the water collection container, and
at least one of the first electrode member and the second electrode member protrudes into the water collection container to be electrically connected to the third electrode member through the water in response to the predetermined amount of water is collected in the water collecting container.

5. The dehumidification device of claim 4, wherein the first electrode member and the second electrode member are formed at different heights.

6. The dehumidification device of claim 1, wherein the sensing unit includes:
a processor configured to output an electrical signal to the first terminal, and receive an electrical signal output from at least one of the second terminal and the third terminal.

7. The dehumidification device of claim 6, further comprising:
a display configured to receive an electrical signal from the processor and display information about the predetermined amount of the water being collected in the water collection container.

8. The dehumidification device of claim 4, wherein the sensing unit includes:
a terminal case provided on an upper side of the first terminal, the second terminal, and the third terminal to cover the first terminal, the second terminal, and the third terminal,
wherein the first terminal, the second terminal, and the third terminal each include a contact portion that is in contact with a respective one of the plurality of electrode members in response to the water collection container is installed inside the main body, and
the terminal case includes:
a separation preventing portion configured to press the contact portions from an upper side of the contact portions, to prevent the contact portions from being separated.

9. The dehumidification device of claim 1, further comprising:
a base plate disposed below the water collection container,
wherein the water collection container includes:
an opening formed in an upper portion of the water collection container, and through which to collect water discharged from inside of the main body, and
a guide duct connecting the opening to the base plate so that water discharged from the opening flows to the base plate.

10. The dehumidification device of claim 9, wherein the guide duct is formed to be inclined downward from the opening to the base plate, and
the water passed through the guide duct is stored in the base plate.

11. The dehumidification device of claim 10, further comprising:
a cover plate disposed above the water collection container and coupled to the base plate to cover the water collection container;
a water storage area formed between the base plate and the cover plate; and
a water storage sensor coupled to the cover plate and protruding into the water storage area to detect water stored in the water storage area.

12. The dehumidification device of claim 11, further comprising:
a water storage passage formed to be inclined downward so that the water discharged from the opening flows from the guide duct to the water storage area.

13. The dehumidification device of claim 11, further comprising:
a display on which information about the stored water is displayed upon the water stored in the water storage area being detected by the water storage sensor.

14. The dehumidification device of claim 5, further comprising:
a door coupled to the main body to open and close the treatment chamber, and
an opening/closing detection sensor disposed at a lower side of the door to detect the opening and the closing of the door,
wherein upon the predetermined amount of the water being detected through the third electrode member, power flowing to the plurality of electrode members is cut off.

15. The dehumidification device of claim 14, wherein upon the door being detected by the opening/closing detection sensor as being opened and then closed, the power is supplied to the plurality of electrode members.

* * * * *